United States Patent
Brown

[15] 3,687,083
[45] Aug. 29, 1972

[54] CONVEYING SYSTEMS FOR AUTOMOBILES AND THE LIKE

[72] Inventor: Ced F. Brown, Redford, Mich.

[73] Assignee: Mike Torosian, Detroit, Mich. ; a part interest

[22] Filed: Nov. 23, 1970

[21] Appl. No.: 92,053

[52] U.S. Cl. .............................................. 104/155
[51] Int. Cl. ............................................. B61b 3/00
[58] Field of Search ........... 198/184, 129, 1; 104/155

[56] References Cited

UNITED STATES PATENTS 3,045,611  7/1962  Murray ...................... 104/155

*Primary Examiner*—Richard E. Aegerter
*Attorney*—Harness, Dickey and Pierce

[57] ABSTRACT

A system particularly suited for conveying automobiles in automated car washes having a plurality of expansible fluid conduits sequentially positioned along a path which are adapted to receive fluid under pressure. Fluid pressure may be selectedly supplied to the fluid conduits in response to the location of the automobile wheel on the conduit to establish a conveying force acting on the wheel by expansion of the fluid conduit. For example, this may be accomplished by a pressure sensitive valve or a valve operated by a mechanical position sensor. In the former system, a sensing fluid flow is established through the fluid which is restricted when a wheel of the automobile is positioned on the conduit to create a pressure increase upstream of the restriction which is transmitted to the pressure sensitive valve for opening thereof to supply full operational fluid flow to the conduit. In the latter system, an automobile engaging member may be pivotally mounted and operatively connected to a supply valve to operate the valve upon pivotal movement of the engaging member.

21 Claims, 6 Drawing Figures

PATENTED AUG 29 1972

INVENTOR.
Ced F. Brown
BY
Hauness, Dickey & Pierce
ATTORNEYS

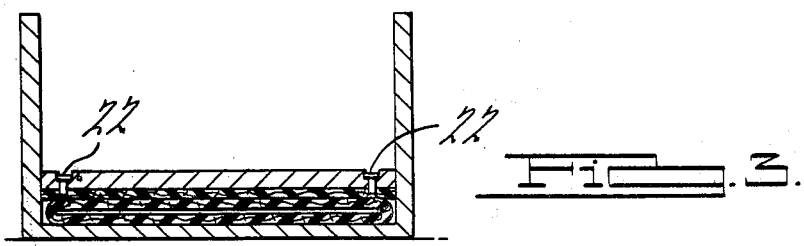
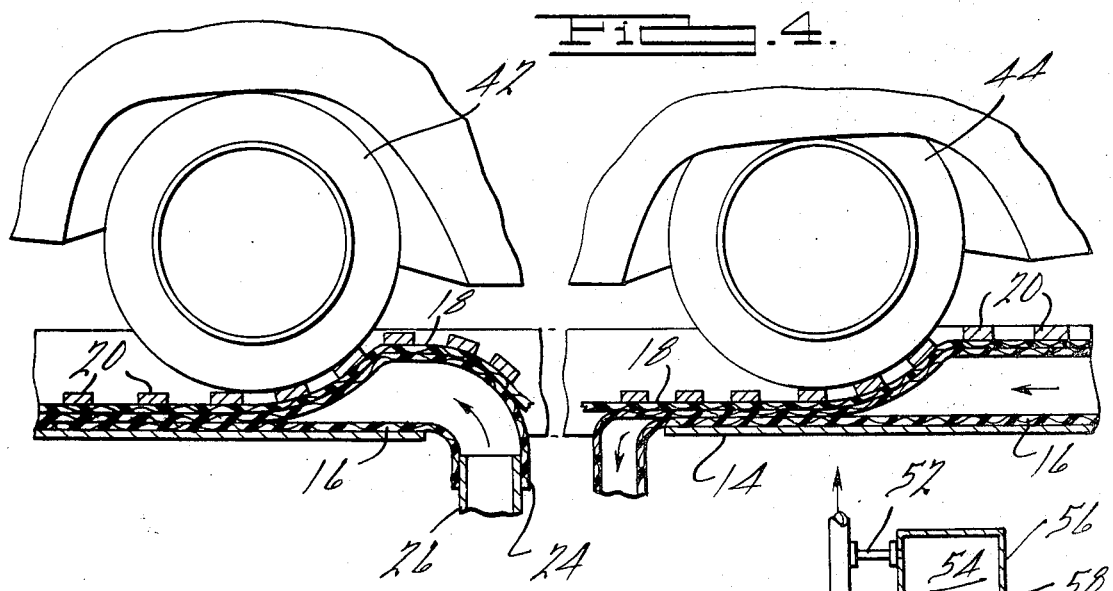
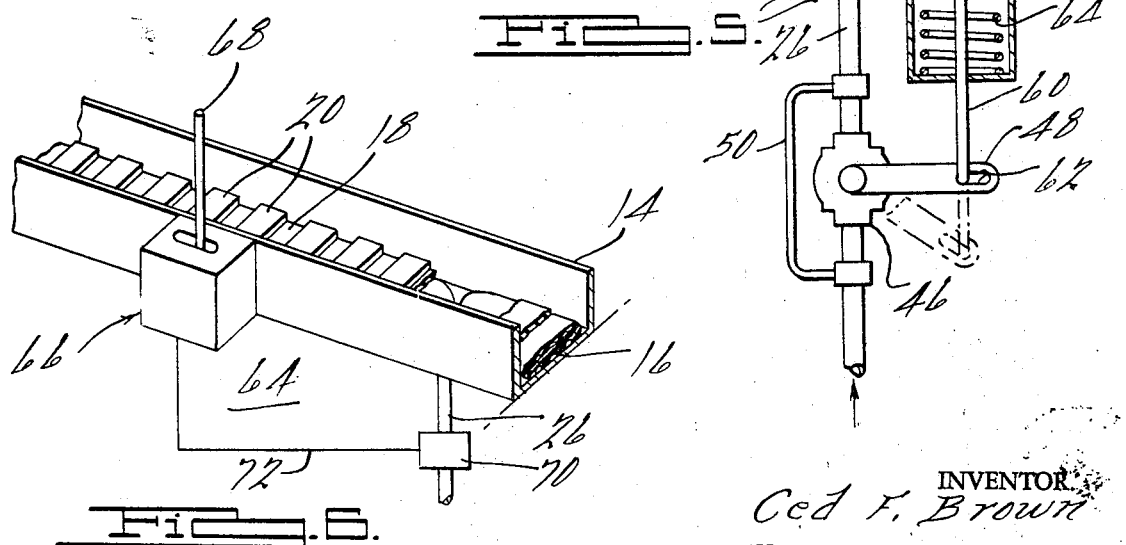

CONVEYING SYSTEMS FOR AUTOMOBILES AND THE LIKE

BACKGROUND AND SUMMARY OF THE INVENTION

Conveying systems currently in use in automatic washing systems for automobiles generally have a mechanical conveyor chain with attached projecting members which engage the automobiles to move then through the various cleaning stations. With the prior art devices, there is a possibility of inflicting damage to automobiles due improper engagement of the projecting members with the automobile. Another practical disadvantage of the prior mechanical conveyor systems is their susceptibility to wear and corrosion. This problem is particularly acute in automotive car washes since it is difficult to maintain proper lubrication of the parts of the conveyor due to their constant exposure to cleaning solutions. Furthermore, the prior art mechanical systems are often objectionably noisy.

The present invention provides an essentially non-mechanical conveying system for automobiles and the like which is not subject to the deficiencies attendant the prior art mechanical devices. An exemplary system according to the present invention uses a plurality of expansible fluid conduits which are sequentially disposed along a preselected path for the automobile in combination with means for sequentially supplying fluid pressure to the conduits to cause them to engage the wheels of an automobile by progressive inflation thereby applying a longitudinal force to the wheels to move the automobile along the selected path. By incorporated of a plurality of sequentially disposed conduits, several automobiles may be concurrently accommodated along the preselected path.

It will be appreciated that the conveyors of this invention do not use mechanical chains or the like, and consequently, are free of noise, wear and lubrication problems associated with the prior art mechanical devices. Additionally, proper engagement with the automobile tire is assured, and therefore, the danger of damage to the automobile by use of the conveying system of this invention is practically non-existent.

BRIEF DESCRIPTION OF THE DRAWINGS

FIG. 3 is a cross-sectional view of a portion of a conveyor system according to this invention taken generally along the lines 3—3 of FIG. 2;

FIG. 4 is a detailed view of a portion of the conveying system of FIG. 1;

FIG. 5 is a partially cut away view of an automatic pressure valve system suitable for use in the conveying system of FIG. 1; and FIG. 6 is a perspective view of a contacting valve control which may be used as a substitute for the automatic pressure valve system of FIG. 5.

DETAILED DESCRIPTION OF THE PREFERRED EMBODIMENTS

Figure 1:
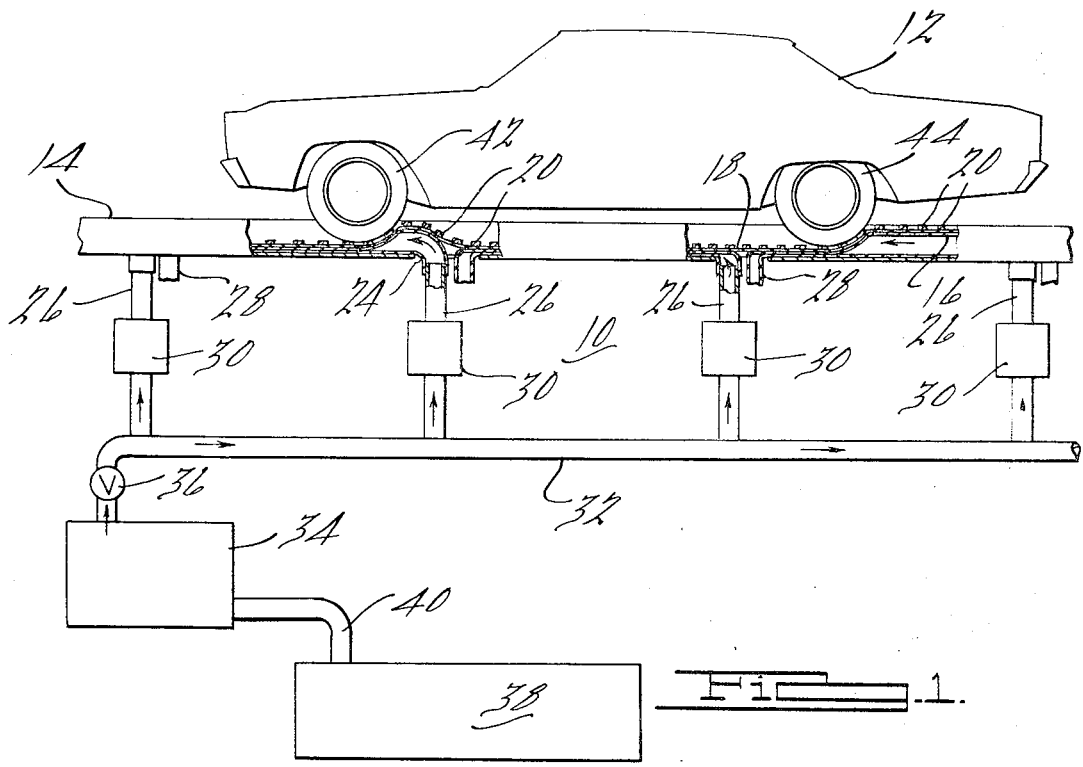
FIG. 1 is an overall side view, partially in schematic, of a conveying system according to this invention shown with an automobile in positional relationship therewith.
Figure 2:
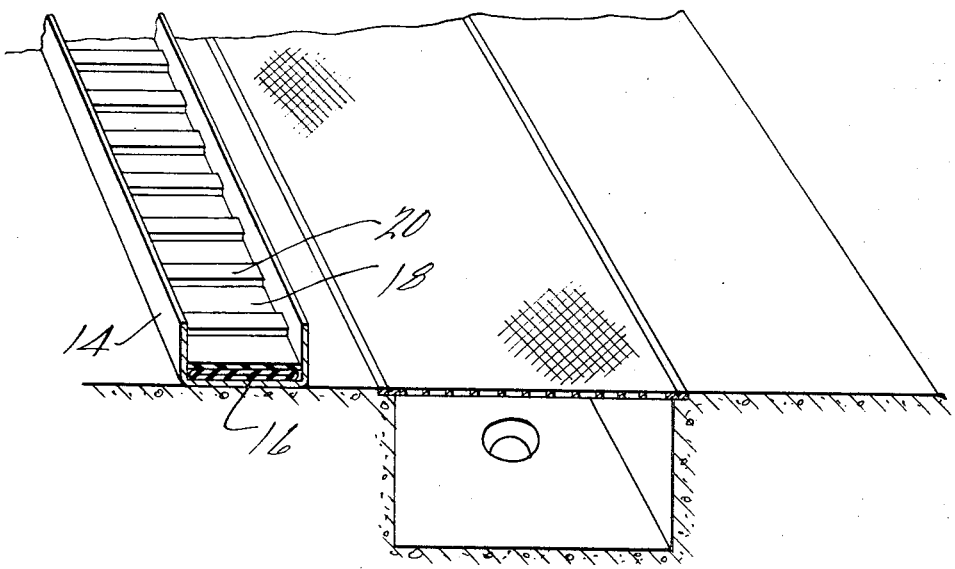
FIG. 2 is a perspective view of a portion of a car wash conveying system according to this invention.

In FIG. 1, a conveying system 10 is shown which may be used to move an automobile 12 or the like along a preselected path defined by a U-channel 14 which is adapted to receive and guide the wheels of the automobile along the preselected path. With additional reference to FIGS. 2–4, it can be seen that the U-channel 14 contains an expansible fluid conduit 16 which may be constructed of rubberized fabric material using essentially the same construction techniques as used for the fire hoses and the like. In its collapsed state wherein the fluid pressure within the conduit 16 is at a minimum, the conduit lies substantially flat as shown. A flexible belt 18 is positioned on top of the conduit 16 and has a plurality of longitudinally-spaced rigid cleats 20 affixed thereto extending transversely the belt for a purpose to be described. For example, the cleats 20 may be fastened to the belt 18 by rivets 22 as illustrated in FIG. 3. Each of the conduits 16 has an inlet end 24 which is connected to an inlet pipe 26 and an outlet end 28 which communicates with a sump or reservoir for fluid egressing from the conduit 16. The inlet conduit 26 has an interposed control valve 30 which is described in detail with respect to FIG. 5. The inlet pipes 26 communicate with a common pressure supply manifold 32 which communicates with a pump or source of fluid pressure 34 through a main shut off valve 36. The pump 34 communicates or receives fluid from a reservoir 38 by means of a supply conduit 40. Preferably, the reservoir 38 received the return flow from the outlets 28 of the expansible conduits 16. The conduits 16 are sequentially arranged within the U-channel 14, preferably with a minimum gap between successive conduits 16. The length of the individual conduits 16 is established such that one of the front or rear wheels of a vehicle being conveyed by the system 10 is disposed intermediate the ends of a conduit 16 at all times. That is to say, the length of the conduits 16 are selected with respect to the range of wheel bases of the vehicles to be conveyed along the channel 14 such that the front and rear wheels of the vehicle are not simultaneously aligned with the gap between adjacent conduits 16. In this manner, at least one of the front or rear wheels of the vehicle is receiving a conveying force at all times. It has been found that in most installations, a length between gaps of approximately 6 feet is satisfactory.

The operation of the system 10 can best be seen with respect to FIGS. 1 and 5. Fluid under pressure, preferably a liquid, is introduced in to the inlets 24 of the flexible conduits 16. The flow of fluid is restricted at the location of the wheels of the vehicle by virtue of the downward force exerted on the conduit by the wheels 16. In this regard, the downward force is transmitted through the ridges 20 and the flexible belt 18. It will be appreciated that wheels or tires of varying width are accommodated by the rigid ridges 20 which transfer the force exerted by the wheel across the entire lateral width of the conduit 16 to effect efficient flow restriction. The interruption or restriction of fluid flow at the wheels causes a pressure increase upstream of the restriction which expands the flexible conduit 16 so that increased pheripheral engagement of the wheels of the vehicle is effected. The expansion is progressive to impose a longitudinally acting force on the wheel which is derived from the fluid pressure within the conduits 16. The longitudinally acting force causes the wheel to roll along the channel 14 away from the expanding conduit 16 which allows continued progressive expansion of the conduit 16 to further roll the wheel along the channel 14.

Although it is possible to maintain a constant operational flow through the conduit 16 to move the vehicle 12 along the intended path, it is preferred not to use full operational flow except when a vehicle is in position to be conveyed in order to conserve fluid pressure and power. This may be accomplished, for example, by a pressure operated or mechanically operated valve. In FIG. 5, a pressure operated valve assembly 30 is shown. The valve assembly 30 includes a valve 46 having a pivotally mounted operating lever 48 which restricts flow of fluid through the valve 46 when in the horizontal position shown by solid lines in FIG. 3 and allows the flow of fluid through the valve 46 when in the downward position illustrated by dotted lines. The pressure responsive valve assembly 30 further includes a bypass line 50 connected in parallel with the valve 46 for permitting a small residual or sensing flow of fluid through the inlet line 26 to bypass the valve 46. The inlet line 26 has a pressure tap 52 down-stream of the valve 46 which communicates with a chamber 54 provided by the combination of a cylinder 56 and a piston 58 sealings by engaging the cylinder 56. The piston 58 is operatively connected to the lever 48 by a piston rod 60 which engages an elongated slot 62 in the lever 48. The piston 58 is biased upwardly by a coiled spring member 64 which consequently biases the lever 48 to the valve-closed position. It can be seen from FIG. 5 that the pressure communicated to the chamber 54 through the pressure tap 52 acts against the piston 58 to urge the lever 48 to the valve-opened position. When no vehicle is positioned on the flexible conduit 16, the pressure established by the bypass flow through the bypass line 50 is fully opposed by the spring 64 such that the lever 48 remains in the valve-closed position. When a vehicle wheel 42 or 44 is positioned on one of the expansible conduits 16, the pressure in the expansible conduit 16 toward the inlet end 24, increases by virtue of the restruction of the sensing flow through the conduit 16. The pressure increase is transmitted to the chamber 54 through the pressure tap 52 to cause downward movement of the piston 58 against the force exerted by the spring 64 to open the valve 46 and cause increased fluid transmission to the inlet line 26. The consequent increased pressure in the conduit 16, i. e. full operational pressure, causes efficient movement of the vehicle 12 along the pathway for the vehicle. When the vehicle 12 has moved such that the wheel 42 or 44 is no longer positioned on the fluid conduit 16, the pressure within the conduit 16 is released through the outlet 28. The pressure decrease is transmitted through the pressure tap 52 to the chamber 54 to allow the spring 64 to return the lever 48 to the valve-closed position. In view of the above explanation, it can be seen then that only a minimal or sensing flow is required through the conduit 16 until such time that a vehicle wheel 42 or 44 is positioned on the conduit 16, at which time the pressure sensitive valve 30 provides full operational fluid flow to the conduit 16. Accordingly, the pressure at the pressure pump 34 is conserved since the flow path to the conduit 16 is not fully opened until the vehicle 12 is positioned on the pathway. It will be further appreciated that the pressure loss is still minimal when the vehicle wheel is on a flexible conduit 16 even through full fluid pressure is delivered to the conduit 16 since the flow of fluid through the conduit 16 is substantially restricted under that condition. Hence, the exemplary conveying system 10 according to this invention is exceptionally efficient.

The pressure sensitive valve assembly 30 may be replaced by mechanical position sensor in combination with a valve operated by the position sensor such as is illustrated at 64 in FIG. 6. The valve assembly 64 may have a position sensor 66 including pivotally mounted rod 68 of nylon or the like projecting into the path of the vehicle for engagement thereby. For example, the rod 68 may extend vertically as shown for engagement by the bumper of the vehicle. Upon engagement with the vehicle, the rod 68 is movable to a position whereby a valve 70 in the inlet line 26 is opened. For example, the sensor 66 may include a pilot valve or electrical switch and may be operatively connected to the valve 70 by a fluid or electrical line 72, respectively. Preferably, the sensor 66 is spaced with respect to a gap between the conduits 16 so that the valve 70 is not opened until one of the vehicle wheels is in position on the conduit 16 for forward movement under the influence of a pressure increase in the expandible conduit 16.

In view of the foregoing description of an exemplary conveying system 10 according to this invention, it will be appreciated that an efficient conveying system is provided which does not require mechanical conveying chains and drives for its operation, and accordingly, does not experience the wear, lubrication and noise problems associated with those devices nor does it have the propensity to damage the conveyed articles as found in prior art devices. Moreover, the conveying system uses a fluid pressure system as its source of power which are commonly found in automatic automobile washing installations. Accordingly, only one power source is needed for both cleaning and conveying of the vehicles which further contributes to the savings realized by incorporation of a conveying system 10 according to the invention.

Although this conveying system has been described with respect to an automatic automatic automobile washing system for which it is ideally suited, it has many other applications where it is desirable to provide a low-cost, efficient system.

While it will be apparent that the teachings herein are well calculated to teach one skilled in the art the method of making the preferred embodiments of this invention, it will be appreciated that the invention is susceptible to modification, variation and change without departing form the proper scope or meaning of the subjoined claims.

What is claimed is:

1. A system for concurrently conveying a plurality of articles each of which having at least two support locations being spaced along a preselected path with a predetermined distance therebetween comprising: a plurality of fluid conduits which are sequentially disposed along said path and are expansible in response to fluid pressure therein, each of said conduits having an inlet and an outlet, said conduits being adapted for positioning of said articles thereon with said support locations along said preselected path for restriction of fluid flow through said conduits at said support locations, the length of said conduits and the disposition thereof along said path being selected in accordance with said predetermined distance so that at least one of support locations being always on one of said conduits whereby a conveying force is maintained on said articles at all times; and means connected to said inlets which are adapted to be connected operable in combination with said plurality of conduits for establishing a conveying force which is exerted on said at least one of said support locations including means for connecting said inlet to a source of fluid for delivering said fluid to said inlets so that the positioning of at least one of said support locations on one of said conduits restricts the flow of said fluid through said one conduit to create a pressure increase between said at least one of said support locations and said inlet of said one conduit causing said one conduit to expand to exert said conveying force on said one of said support locations.

2. A system according to claim 1 wherein said means for establishing a conveying force includes means for sensing when an article is positioned on one of said conduits.

3. A system according to claim 2 wherein said means for establishing a conveying force supplies fluid to said inlet for said one conduit in response to said article being positioned on said conduit.

4. A system according to claim 2 wherein said means for establishing a conveying force provides a sensing flow through said conduits, said pressure between said at least one support location and said inlet increases in response to said article being positioned thereon, and said means for establishing a conveying force increases said flow of fluid in response to said pressure increase.

5. A system according to claim 4 wherein said means for establishing a conveying force includes a pressure valve for each conduit, each of said valves being connected to a respective one of said inlets for delivery of said fluid to the respective one of said conduits when said valve is opened, said valves being openable in response to the pressure increase in the respective one of said conduits so that an article positioned on one of said conduits causing a pressure increase in said one conduit by restriction of said sensing flow to open said valve to increase the flow of fluid to said one conduit.

6. A system according to claim 5 wherein said means for establishing a conveying force further includes a fluid passage bypassing said valve for providing said sensing flow.

7. A system according to claim 2 wherein said article is positionable on said conduit at spaced locations along said preselected path, the length of said conduits being disposed along said path being less than the distance between said spaced locations with said length being selected so that at least one of said locations being always on one of said conduits whereby a conveying force is maintained on said article at all times.

8. A system according to claim 7 wherein said article is an automobile having at least one front wheel and at least one rear wheel, said conduits being adapted to have said wheels positioned thereon, and spaced locations being at said wheels.

9. A system for concurrently conveying an automobile having at least one front wheel and at least one rear wheel disposed along a preselected path comprising: a plurality of fluid conduits which are sequentially disposed along said path and are expansible in response to fluid pressure therein, each of said conduits having an inlet and an outlet, said conduits being adapted for positioning of said wheels thereon at spaced locations along said preselected path, the length of said conduits being disposed along said path being less than the distance between said spaced locations and being selected so that at least one of said locations being always on one of said conduits whereby a conveying force is maintained on said automobile at all times; means operable in combination with said plurality of conduits for establishing a conveying force which is exerted on said one of said front or rear wheels including means for connecting said inlets to a source of fluid for delivering said fluid to said inlets so that the positioning of at least one of said front and rear wheels on one of said conduits restricts the flow of said fluid through said one conduit to create a pressure increase between said at least one of said front and rear wheels and said inlet of said one conduit causing said one conduit to expand to exert said conveying force on said one of said front or rear wheels, said means for establishing a conveying force on said one of said front or rear wheels including means for sensing when an article is positioned on one of said conduits; and means disposed between said one of said front and rear wheels and said conduits extending transversely of said conduits for applying a force exerted thereon by said one of said front and rear wheels to substantially the entire transverse dimension of said conduit whereby effective restriction of fluid flow through said conduit is attained.

10. A system according to claim 9 further including flexible belt means on said conduits and wherein said transverse means are a plurality of rigid, cleats disposed transversely of said conduit and longitudinally spaced along said preselected path.

11. A system according to claim 10 wherein said means for establishing a conveying force supplies fluid to each of said inlets for said conduits on which said wheels are positioned.

12. A system according to claim 10 wherein said means for establishing a conveying force provides a sensing flow through said conduits, said pressure between said at least one support location and said inlet increases in response to said article being positioned thereon, and said means for establishing a conveying force increases said flow of fluid in response to said pressure increases.

13. A system according to claim 12 wherein said means for establishing a conveying force includes a pressure valve for each conduit, each of said valves being connected to a respective one of said inlets for delivery of said fluid to the respective one of said conduits when said valve is opened, said valves being openable in response to the pressure increase in the respective one of said conduits so that pressure increase is established in each of said conduits when said wheels are positioned thereon by restriction of said sensing flow to open said valve to increase the flow of fluid to each of said conduits on which said wheels are positioned.

14. A system according to claim 13 wherein said means for establishing a conveying force further includes a fluid passage for each valve bypassing said each valve for providing said sensing flow.

15. A system for concurrently conveying a plurality of automobiles each of which having at least one front wheel and at least one rear wheel disposed along a preselected path, said automobiles having a predetermined range of wheelbase dimensions between said front and rear wheels comprising: a plurality of fluid conduits which are sequentially disposed along said path and are expansible in response to fluid pressure therein, each of said conduits having an inlet and an outlet, said conduits being adapted for positioning of said wheels thereon at spaced locations along said preselected path, the length of said conduits and the disposition thereof along said path being selected in accordance with said range of wheelbase dimensions so that said locations for each said front and rear wheels being always on one of said conduits whereby a conveying force is maintained on said automobiles at all times; and means operable in combination with said plurality of conduits for establishing a conveying force which is exerted on said one of said front or rear wheels including means for connecting said inlet to a source of fluid for delivering said fluid to said inlets so that the positioning of at least one of said front and rear wheels on one of said conduits restricts the flow of said fluid through said one conduit to create a pressure between said at least one of said front and rear wheels and said inlet of said one conduit causing said one conduit to expand to exert said conveying force on said one of said front or rear wheels.

16. A system according to claim 15 wherein each of said conduits have opposite ends and wherein said conduits are disposed along said preselected path with adjacent ends of said conduits being closely spaced, and wherein the length of said conduits is selected to be different than said range of wheelbase dimensions.

17. The system in accordance with claim 16 wherein said lengths of said conduits is selected to be substantially smaller than said range of wheelbase dimensions.

18. A system for conveying an article along a preselected path comprising: a fluid conduit disposed along said path which is expansible in response to fluid pressure therein, said fluid conduit having an inlet and an outlet and being adapted for positioning of said article thereon for restricting fluid flow therethrough at said article; and means operable in combination with said conduit for sensing the positioning of an article on said conduit and for establishing a conveying force which is exerted on said article including means for connecting said inlet to a source of fluid for delivering fluid to said inlet so that the positioning of said article on said conduit restricts the flow of said fluid through said conduit to create a pressure increase between said article and said inlet of said conduit causing said conduit to expand to exert said conveying force on said article, said means establishing a conveying force providing a sensing flow and a conveying flow through said conduit at selected times with said sensing flow being substantially less than said conveying flow, the restriction of said sensing flow through said conduit providing a pressure increase between said article and said inlet, said means for establishing a conveying force further including means responsive to said pressure increase caused by said article being positioned on said conduit for establishing said conveying flow.

19. According to claim 18 wherein said means responsive to said pressure increase is a pressure sensitive valve means for increasing said flow from said source to said inlet consequent said pressure increase.

20. A conveying system for concurrently conveying a plurality of automobiles, each having at least one wheel disposed along a preselected path comprising: a plurality of fluid conduits which are sequentially disposed along said path and are expansible in response to fluid pressure therein, each of said conduits having an inlet and an outlet, and conduits being adapted for positioning of said one wheel thereon and for restriction of fluid flow therethrough at said one wheel, said path being sufficiently long so as to accommodate a plurality of automobiles, said conduits having a predetermined length and being disposed so that the wheels of respective ones of said plurality of automobiles are positioned on separate ones of said plurality of conduits whereby said plurality of automobiles can be concurrently conveyed along said path; means connected to said inlets which is adapted to be connected to a source of fluid for delivering said fluid to said inlets so that one of said wheels being positioned on one of said conduits restricts the flow of said fluid through said one conduit to create a pressure increase between said one wheel and said inlet of said one conduit causing said one conduit to expand to exert to conveying force on said one wheel.

21. A system for conveying an automobile having wheel of predetermined transverse dimension disposed along a preselected path comprising: a fluid conduit disposed along said path which is expansible in response to fluid pressure therein, said conduit having an inlet and an outlet, and conduit being adapted for positioning of said one wheel thereon and for restriction of fluid flow therethrough at said one wheel positioned thereon; said fluid conduit having transverse dimension at least when not expanded which is greater than said wheel transverse dimension, said fluid conduit further including means disposed between said wheel and said conduit extending transversely of said conduit for applying a force exerted thereon by said wheel to substantially the entire transverse dimension of said conduit whereby effective restriction of fluid flow through said conduit is attained; and means connected to said inlet which is adapted to be connected to a source of fluid for delivering said fluid to said inlet so that said one wheel positioned on one of said conduits restricts the flow of said fluid through said conduit to create a pressure increase between said one wheel and said inlet of said conduit causing said conduit to expand to exert a conveying force on said one wheel.

* * * * *